United States Patent [19]

Tarr et al.

[11] Patent Number: 5,184,179
[45] Date of Patent: Feb. 2, 1993

[54] PHOTOCOPY MONITORING SYSTEM AND METHOD FOR MONITORING COPIERS

[75] Inventors: Leonard Tarr, Woodbury, N.Y.; Gregory King, Andover; Brian Johansen, Bricktown, both of N.J.

[73] Assignee: Monitel Products Corp., Cedar Knolls, N.J.

[21] Appl. No.: 739,060

[22] Filed: Jul. 31, 1991

Related U.S. Application Data

[63] Continuation-in-part of Ser. No. 341,018, Apr. 20, 1989, which is a continuation-in-part of Ser. No. 194,710, May 17, 1988, abandoned.

[51] Int. Cl.$^5$ .............................. G03G 15/00
[52] U.S. Cl. ................... 355/206; 355/209; 355/308; 340/825.06; 235/385
[58] Field of Search ............... 355/207, 209, 203–206, 355/308; 340/825.06, 825.17; 235/385; 364/478

[56] References Cited

U.S. PATENT DOCUMENTS

| | | |
|---|---|---|
| 3,638,191 | 1/1968 | Mann . |
| 3,656,145 | 3/1969 | Proops . |
| 3,842,408 | 8/1972 | Wells . |
| 3,858,181 | 10/1973 | Goldsby et al. . |
| 3,984,032 | 5/1974 | Hyde et al. . |
| 3,997,873 | 12/1976 | Thornton . |
| 4,071,911 | 4/1976 | Mazur . |
| 4,086,434 | 9/1976 | Bocchi . |
| 4,124,887 | 4/1977 | Johnson et al. . |
| 4,144,550 | 5/1977 | Donohue et al. . |
| 4,160,255 | 7/1979 | Kobayashi .................. 355/208 |
| 4,167,322 | 9/1979 | Yano . |
| 4,199,100 | 4/1980 | Wostl et al. . |
| 4,283,709 | 8/1981 | Lucero et al. . |
| 4,300,040 | 11/1981 | Gould et al. . |
| 4,314,334 | 2/1982 | Daughton et al. . |
| 4,358,756 | 11/1982 | Morel et al. . |
| 4,369,442 | 1/1983 | Werth et al. . |
| 4,455,453 | 6/1984 | Parasekvakos et al. . |
| 4,456,790 | 6/1984 | Soyack . |
| 4,477,901 | 10/1984 | Braband . |
| 4,496,237 | 1/1985 | Schron . |
| 4,497,037 | 1/1985 | Kato et al. . |
| 4,501,485 | 2/1985 | Tsudaka . |
| 4,506,974 | 4/1985 | Sugiura et al. . |
| 4,509,851 | 4/1985 | Ippolito et al. . |
| 4,510,491 | 4/1985 | Prato . |
| 4,523,299 | 6/1985 | Donohue et al. . |
| 4,549,044 | 10/1985 | Durham . |
| 4,574,283 | 3/1986 | Arakawa . |
| 4,578,538 | 3/1986 | Pascucci et al. . |
| 4,583,834 | 4/1986 | Seko et al. . |
| 4,595,921 | 6/1986 | Wang et al. . |
| 4,611,205 | 9/1986 | Eglise . |
| 4,630,042 | 12/1986 | Kawasaki et al. . |

(List continued on next page.)

FOREIGN PATENT DOCUMENTS 0121332 10/1984 European Pat. Off. .

OTHER PUBLICATIONS

Abstract, Japanese Kokai Published Application 59-116761, published Jul. 5, 1984.

(List continued on next page.)

Primary Examiner—Richard L. Moses
Attorney, Agent, or Firm—Blum Kaplan

[57] ABSTRACT

A system for monitoring a variable output paper processing device is provided. The monitoring system includes a counter which counts the number of papers processed and provides a count signal for each paper counted. A controller receives the count signals and totals the counts. The controller includes an internal clock as well as an interrupt signal generator. Upon receipt of the count signal, the interrupt generator generates an interrupt signal starting the internal clock. The internal clock has a duration of a predetermined value larger than random noise signals. The controller compares the internal clock signal to the count signal and determines whether a valid count has occurred. The controller includes a CPU and RAM which are coupled by a PAL which isolates the RAM from the CPU when a voltage supplied to the CPU and PAL falls below a predetermined level.

11 Claims, 10 Drawing Sheets

U.S. PATENT DOCUMENTS

| | | |
|---|---|---|
| 4,634,258 | 1/1987 | Tanaka et al. . |
| 4,654,800 | 3/1987 | Hayashi et al. . |
| 4,658,243 | 4/1987 | Kimura et al. . |
| 4,708,469 | 11/1987 | Bober et al. . |
| 4,709,149 | 11/1987 | Takahashi et al. . |
| 4,723,212 | 2/1988 | Mindrum et al. . |
| 4,752,950 | 6/1988 | Le Carpentier . |
| 4,766,548 | 8/1988 | Cedrone et al. . |

OTHER PUBLICATIONS

Abstract, Japanese Kokai Published Application 56-27161, published Mar. 16, 1981.

Abstract, Japanese Kokai Published Application 59-81656, published May 11, 1984.

Abstract, Japanese Kokai Published Application 59-91456, published May 26, 1984.

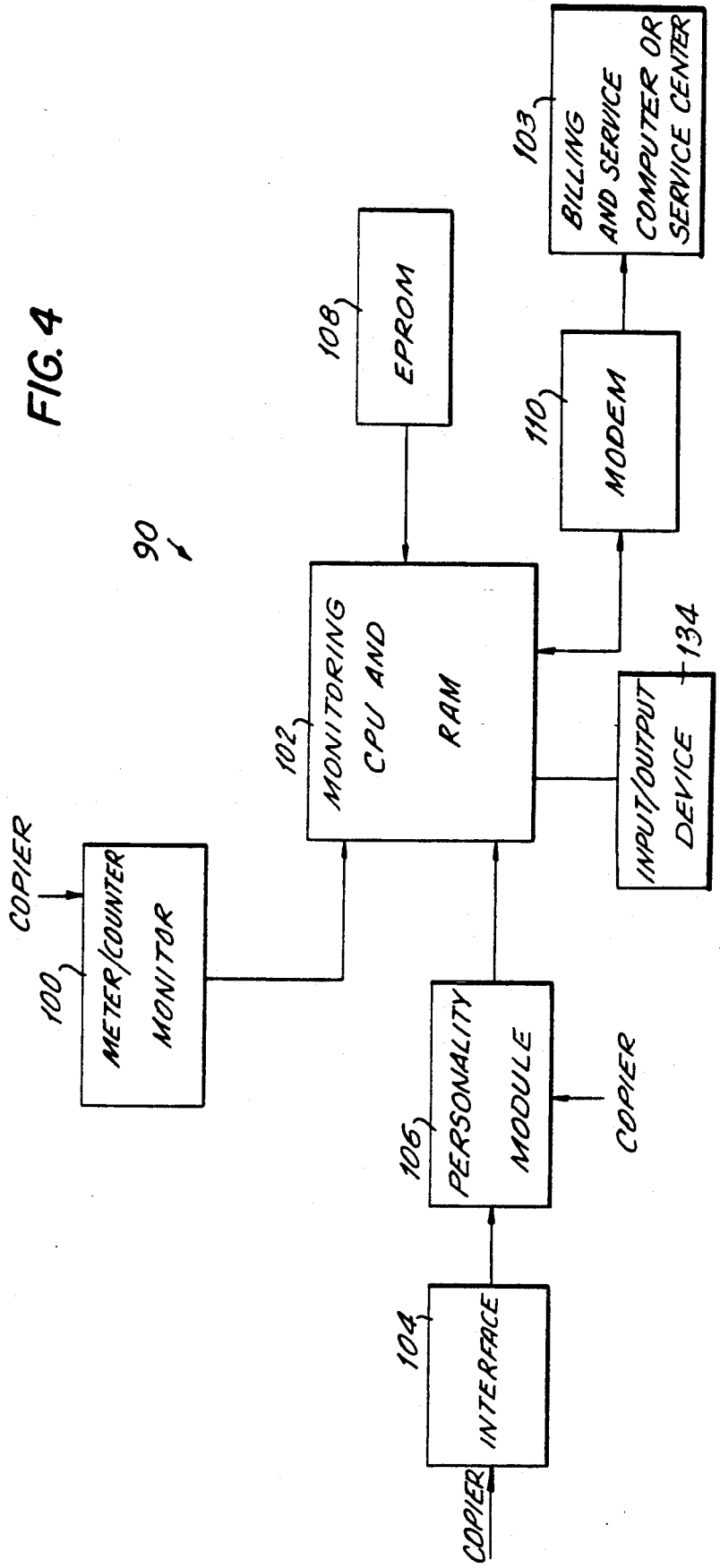

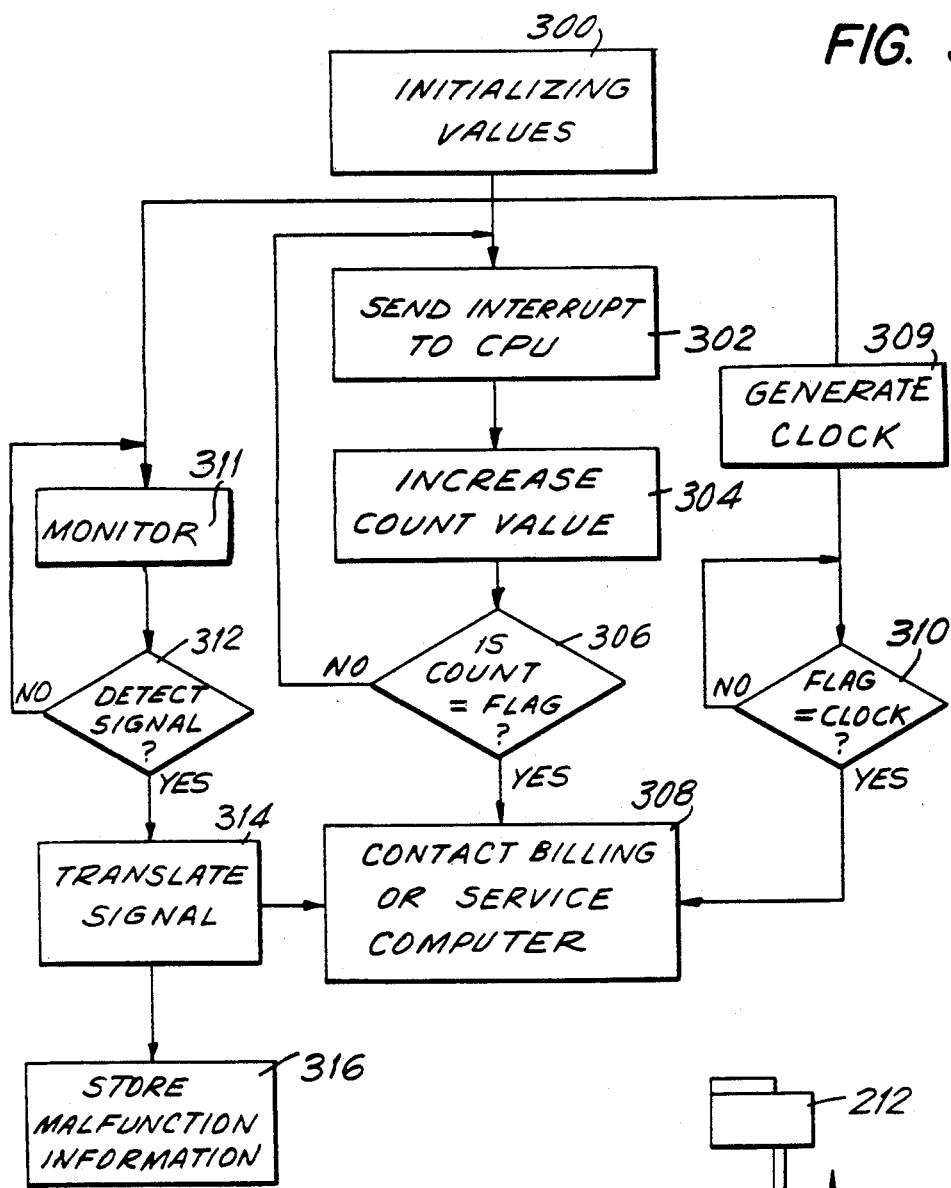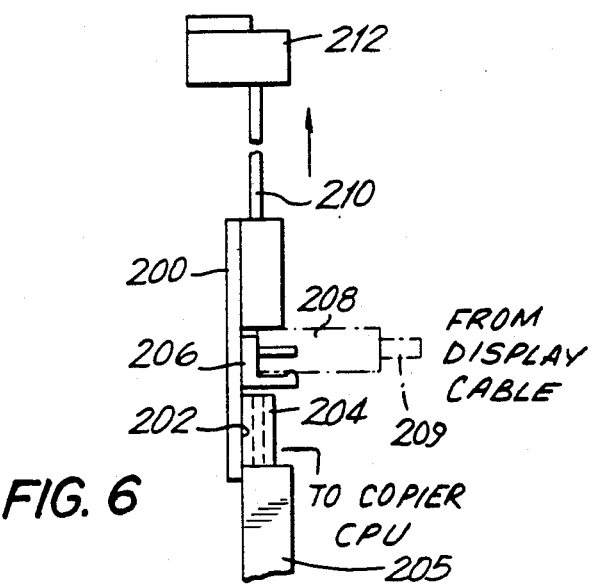

PHOTOCOPY MONITORING SYSTEM AND METHOD FOR MONITORING COPIERS

CROSS REFERENCE TO OTHER APPLICATIONS

This is a Continuation-In-Part Application of U.S. application Ser. No. 07/341,018 filed Apr. 20, 1989 which is a Continuation-In-Part Application of U.S. application Ser. No. 07/194,710 filed on May 17, 1988, now abandoned.

BACKGROUND OF THE INVENTION

This invention relates to a system for monitoring one or more paper processors, and in particular to a method and apparatus for monitoring photocopiers and signaling to the appropriate party information regarding the number of copies made during a predetermined time interval; when a predetermined number of copies have been made; when service is necessary; and calendar events such as when rental agreements or service contracts have expired.

Photocopier monitoring systems are known in the prior art from U.S. Pat. No. 4,583,834. This device monitors a number of copying machines utilizing a number of sensors placed on the copier for sensing various operating parameters such as the number of copies made by the machine, machine malfunctions and the amount of toner remaining in the machine. Signals representing these parameters are transmitted to a central processor. The count values transferred to the central processor are at predetermined intervals. One of the disadvantages of the system is that noise may be interpreted as paper processing, providing a false count in the centralized processor causing preventive maintenance to occur at the wrong time as well as inaccurate billing reports. Additionally, the prior art monitoring systems provide no means for contacting the appropriate party such as a remote service man or billing center when a power outage has occurred. Lastly, these prior art references suffer from the disadvantage that the memory is susceptible to changes arising from voltage spikes, noise or other spurious signals generated within the system.

Accordingly, it is desirable to provide a system for monitoring a copying machine which overcomes the shortcomings of the prior art systems described above.

SUMMARY OF THE INVENTION

Generally speaking, in accordance with the invention, a system for monitoring a printing or paper processing device, such as a photocopier, and automatically notifying the appropriate off site parties at appropriate times of the status of the service contract and preventive maintenance needs is provided. A counter counts the number of papers processed by the copier producing a count signal and interrupt signal. A monitoring system computer receives the count signal as well as an interrupt signal. Upon receipt of the interrupt signal it generates an internal clock signal having a predetermined duration less than a valid count signal. It compares the length of the count signal to the internally generated clock signal and increments a stored total count value if the count signal has a duration greater than the internal clock signal.

A voltage regulator is provided for detecting the presence of voltage supplied by the copier as well as an AC power source. In the absence of both of these voltages, the voltage regulator switches to battery power. The control means generates a second internal clock and powers down the entire system if the system has been powered by battery power for a time period greater than a second predetermined time interval.

The control means includes a central processing unit (CPU) which operates on a memory. A programmable logic array (PAL) is coupled between the CPU and the memory and decodes the instructions of the CPU and addresses the memory. When the voltage supplied to the CPU and PAL falls below a predetermined level required for properly operating on the memory, the PAL isolates the memory from the CPU and remaining circuitry of the monitoring system, preventing inadvertent writing in the memory.

Accordingly, it is an object of this invention to provide an improved system for monitoring photocopiers.

Another object of this invention is to provide a system which maintains the integrity of the system during power outages and then notifies the appropriate off site personnel of such a power outage after power is restored.

A further object of this invention is to provide a system which provides proper count values.

Yet another object of this invention is to provide a system for monitoring a photocopier which prevents inadvertent writing in the memory.

Still other objects and advantages of the invention will in part be obvious and will in part be apparent from the specification and drawings.

The invention accordingly comprises the several steps and the relation of one or more of such steps with respect to each of the others, and the apparatus embodying features of construction, combination of elements and arrangements of parts which are adapted to effect such steps, all as exemplified in the following detailed disclosure, and the scope of the invention will be indicated in the claims.

BRIEF DESCRIPTION OF THE DRAWINGS

For a fuller understanding of the invention, reference is had to the following description, taken in connection with the accompanying drawings, in which:

FIG. 4 is a block diagram of an alternative embodiment of photocopier monitoring system in accordance with the invention;

FIG. 5 is a flow chart illustrating the operation of the photocopier monitoring system in accordance with the invention;

FIG. 6 is a side elevational view of an interface for connecting the photocopier to the photocopier monitoring system

DETAILED DESCRIPTION OF THE PREFERRED EMBODIMENTS

Generally, paper printing and processing devices, and in particular photocopiers, contain a display device, usually a liquid crystal, LED or other alpha-numeric display, for visually displaying to the user the status of the devices. The internally generated signals which drive the display device include diagnostic signals which cause the photocopier display to display malfunctions within the photocopier or report maintenance requirements such as toner and paper refill. A paper count signal drives the display device, in this case usually an internal, readable counter to display a total paper count value corresponding to the number of sheets of paper processed by the photocopier. A photocopier monitoring system constructed in accordance with the invention monitors the diagnostic signals and upon detection of a diagnostic signal, translates the diagnostic signal into a signal usable by an off site end user to determine the condition of the photocopiers. This translated signal is automatically forwarded to the end user upon detection. The last such signal is stored for use by the service personnel or in case of disruption in transmission facilities. Additionally, the photocopier monitoring system constructed in accordance with the invention monitors the count signal to determine a total count value based upon the number of counts detected during a predetermined interval and automatically notifies an off site end user when a predetermined number of counts has occurred or what number of counts has occurred in a predetermined real time interval. The predetermined interval and count number correspond to billing cycles, preventive maintenance intervals and contract termination intervals, allowing appropriate personnel located at a central station off site from the photocopier being monitored to automatically provide the appropriate service requirement and maintain accurate billing records. The monitoring system may either be attached to an existing copier or constructed within the copier at the time of manufacture.

Figure 1:
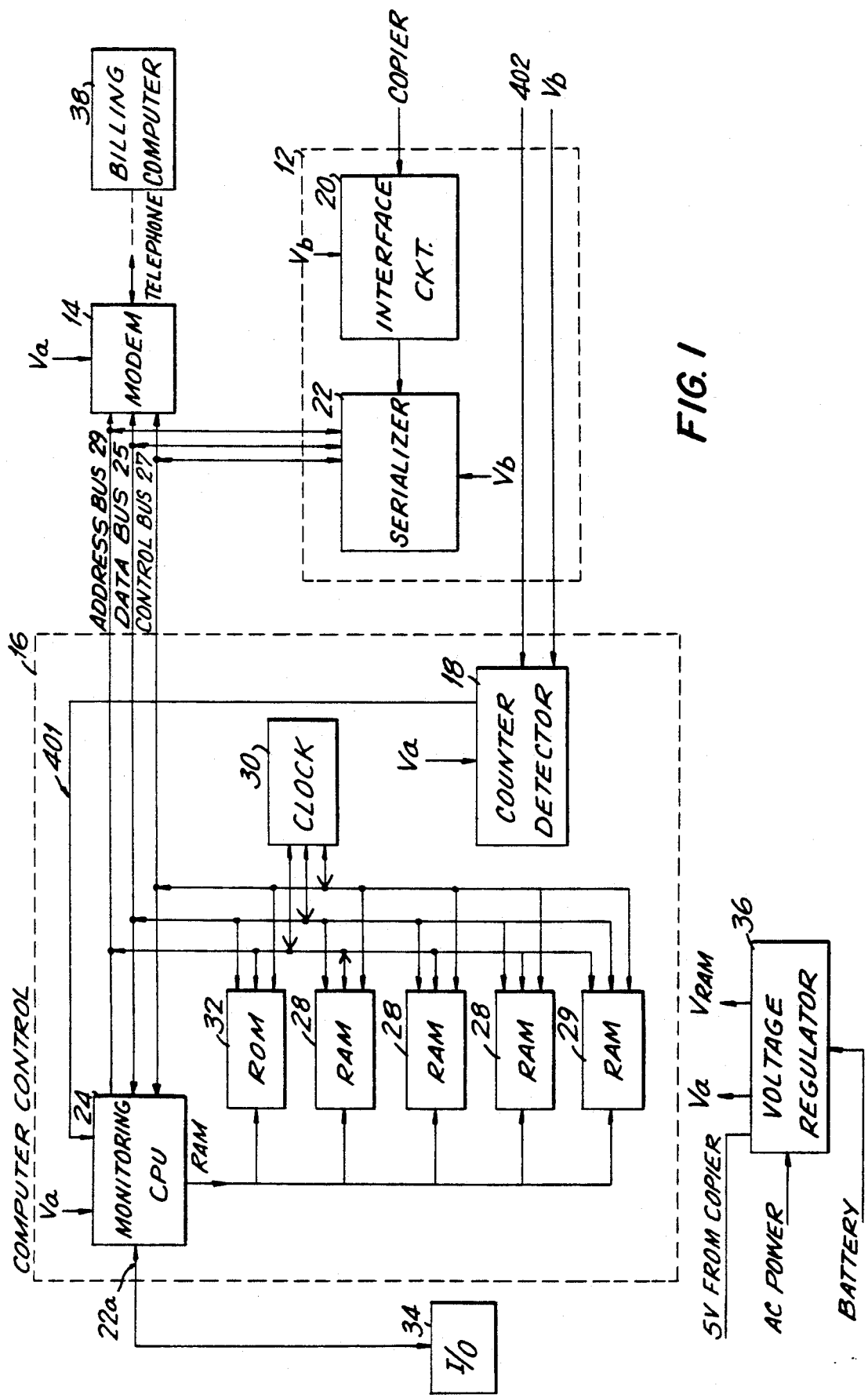
FIG. 1 is a block diagram of a system for monitoring a photocopier constructed in accordance with the invention.

Reference is made to FIG. 1 wherein a first specific photocopying monitoring system, generally indicated as 10, constructed in accordance with the invention, is depicted. The system includes an interface 12, a modem 14 and a computer control 16. Interface 12 receives signals from a copier (not shown) and transmits those signals to computer control 16. Computer control 16 causes modem 14 to transmit certain signals to an appropriate party, for example to a billing computer 38.

Modem 14 may be a 300/9600 BAUD modem and is utilized for data transfer and call progress detection.

Figure 7:
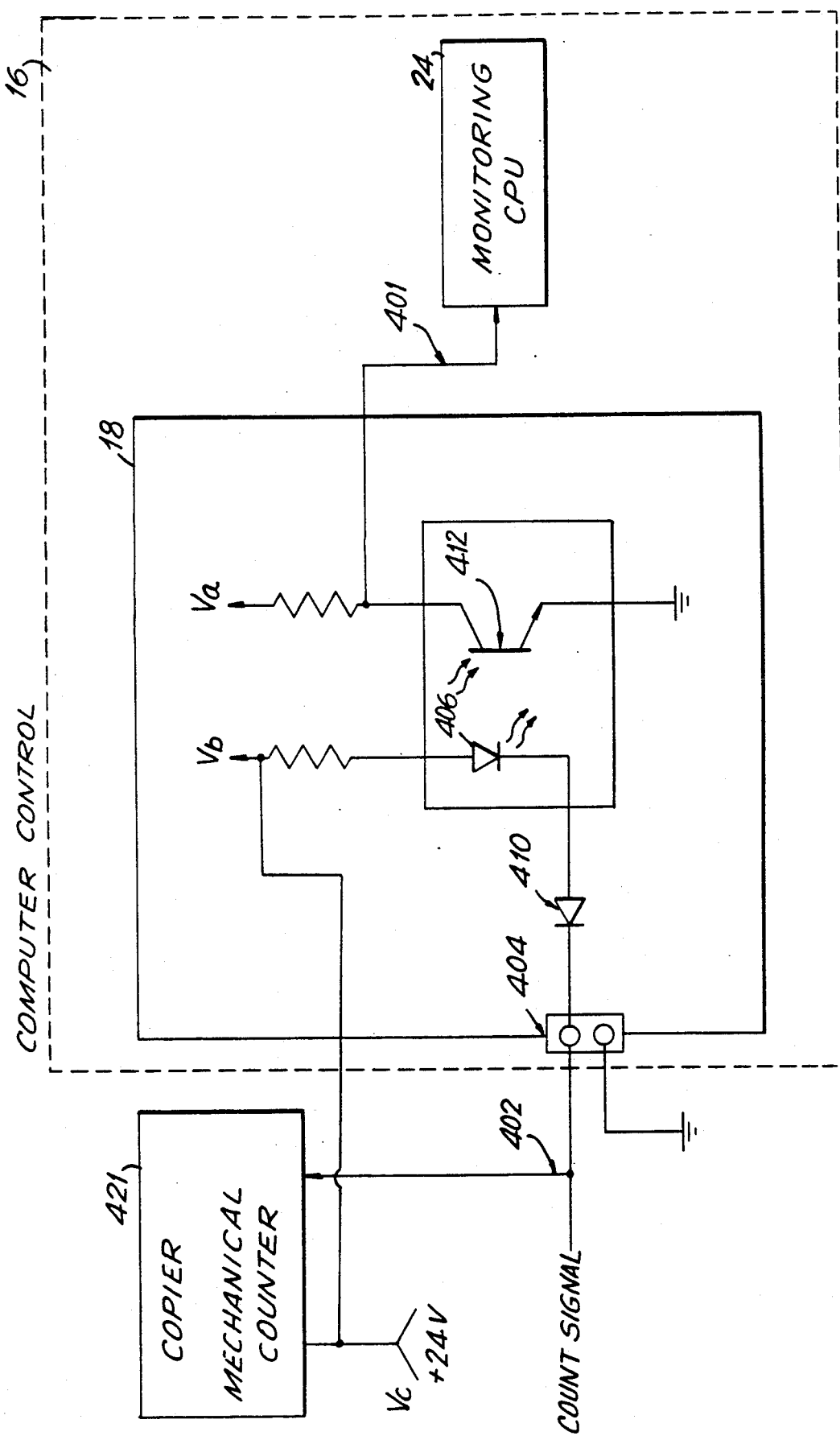
FIG. 7 is a circuit diagram of a meter counter monitor constructed in accordance with the invention.

Each paper processing device has an internal paper counter, this counter counts paper and produces an internal count signal 402 which increments the counter. The count signal 402 is input to monitoring CPU 24. The count detector 18 receives a count signal 402 each time a piece of paper has been processed by the paper processing device. Count detector 18 then sends an interrupt signal 401 to monitoring CPU 24 to count a piece of paper in RAM 28. One example of a count detector 18, shown in FIG. 7, is an optocoupler version of a count detector 18.

Many photocopying machines, such as model EP470Z manufactured by Minolta Camera Co., Ltd. have an internal mechanical counter 12, with two input terminals for connection to the internal circuitry of the photocopying machine. Accordingly, one of the two terminals of the copier internal counter which receives the paper count signal 402, is coupled to one of the terminals of a terminal block 404. An LED 406 is connected through diode 410 to that terminal of block 404. The anode of LED 406 is connected in series with a copier voltage source Vb and a resistor 408. The emitter-collector path of light detecting transistor 412 is coupled between ground and a series connected resistor 416 and a voltage source Va. The output of the light detecting transistor 412 taken between resistor 416 and transistor 412 applies an interrupt control signal 401 to monitoring CPU 24. A typical optocoupler comprising LED 406 and phototransistor 412 suitable for use is part no. 4n27 manufactured by Motorola.

In the embodiment described above, internal mechanical counter 12 is coupled to a twenty four volt power supply and thus provides a twenty four volt count signal 402. When a piece of paper is processed by the paper processing device, a count signal 402 on terminal 404 drops to substantially zero providing a interrupt signal. When the voltage of the paper counter signal 402 is substantially zero, LED 406 and diode 410 are forward biased forming a current path between a five volt source generated by the copier, Vb, and terminal 404 having count signal 402 as its input, thus lighting LED 406. The current flows for the duration of the paper count signal 402. Light detecting transistor 412 detects the light emitted by LED 406 and turns on, pulling the interrupt signal 401 low to monitoring CPU 24, indicating that a piece of paper has been processed, and monitoring CPU 24 operates on the interrupt signal 401 to begin a count sequence. Preferably, monitoring CPU 24 only operates on the falling edge of interrupt signal 401.

When the paper processing device is off, LED 406 does not become lit because both the copier counter voltage Vc and Vb are twenty four volts and are not being driven by the copier while the interrupt signal on line 401 is maintained at a high logic level by a backup battery supply. Therefore, paper counter signal 402 prevents a path to ground when no power is applied to the paper counting device. Additionally, copier counter 402 does not damage LED 406 when high (at 24 volt signal) due to diode 410 which blocks current flow from copier counter 421. As described above, an optocoupler may be used as count detector 18. However, it is envisioned that count detector 18 may be a light beam trigger as discussed, a magnetic pickup or the like.

Computer control 16 includes a monitoring central processing unit ("CPU") 24 which receives the count signal produced by counter 18 along a data bus 25. Monitoring CPU 24 counts the number of count signals detected by storing a total count value in a random access memory ("RAM") 28 which is incremented each time a count signal is received. In an exemplary embodiment three RAMs 28 are provided. Monitoring CPU 24 controls where the respective total count values have been stored by assigning an address to each total count value. Monitoring CPU 24 may be a Hitachi 6305 microprocessor, an Intel 80c31, or the like.

A real time clock 30 sends a signal at predetermined intervals to monitoring CPU 24. Monitoring CPU 24 at these predetermined intervals then sends a control signal along a control bus 27 to retrieve the count information stored in RAMs 28. The data stored in RAMs 28 is transmitted along the data bus. Information concerning the location of stored data is transmitted along address bus 23. Monitoring CPU 24 transmits the data along the data bus 25 to modem 14 which may be part of a local area network or coupled to a telephone line. Monitoring CPU 24 signals modem 14 along control bus 27 to transmit the count information to the appropriate central station billing computer 38.

By providing a count detector 18 which counts the number of pages processed and transmits that count to computer control 16 which stores that information until a predetermined time and then transmits that information to a billing center at predetermined intervals, an automatic billing system is provided. For example, clock 30 may be set for monthly intervals, thereby monitoring CPU 24 transmits through modem 14 to a billing center the number of copies made each month. The time at which each monitoring system reports to the central station is staggered so that not all copier monitoring systems report at once preventing a report traffic jam at the central station billing computer. The billing computer then automatically receives the necessary information to produce bills at a predetermined time interval, minimizing the need for human intervention.

Billing computer 38 is provided with a customer identification data base in which is stored identification data for identifying each copier, such as copier serial number, copier model, the telephone number at which the copier is located and the last reported meter count of the copier.

When transmitting the count data to the billing computer, photocopier monitoring system 10 will identify itself with the identifying code as described below in connection with FIG. 4. A modem located at the central station billing computer answers the phone and receives the count data from modem 14 of photocopier monitoring system 10. The billing computer compares the incoming identification number with an identification number stored within the billing computer data base to verify that the incoming call is in fact a valid call from a legitimate photocopier monitoring system. Each incoming call is then recorded in a transaction log file of the billing computer data base. The monthly meter count that is stored in the transaction log data base is then utilized to update the meter count information as stored in the customer identification data base. This data base may now be used to prepare a billing report for each customer. This may be done manually by reentering the updated identification data base into an already existing billing system or by directly inputting this information into a billing software program for automatically generating a billing report upon the input of the updated count.

Furthermore, each copier uses a portion of consumable goods, such as but not limited to toner, developer and paper, when producing copies. By knowing the number of copies made as reported by the monitoring system how much of each consumable good is used per copy, a monthly total of consumed goods may be calculated. This allows the central station to maintain consumable good inventories for each copier. The central station would then arrange for quick replenishing of low consumable good inventories, reducing copier down time and protecting good copy quality.

As will be discussed below, the photocopier monitoring system also provides photocopier diagnostic information, preventive maintenance information and end of service contract information. When this information is transmitted to the billing computer, the billing computer again validates the incoming message and records the incoming message in a transaction log file. The contents of this file are then applied to update the customer identification file. Simultaneously, the billing computer operator is notified that an incoming diagnostic message or other message requiring action has arrived. The operator may be notified by a display indicator on the monitor screen associated with the billing computer 38 to either indicate that a report is on hand and may be read or the actual report itself will be displayed on the screen. The billing computer operator may then ask for a hard copy of the report and respond to the message as appropriate. Similarly, the operator would be notified when preventive maintenance is required or when a calendar event such as service contract termination occurs. While only a single billing computer 38 is depicted, separate service and billing computers at different telephone numbers can be provided to perform separate functions.

The billing center may also send a signal to monitoring system 10 to retrieve the paper count information. Billing computer 38 also contains an internal real time clock (not shown) which indicates after a predetermined time period that a signal should be incoming from photocopier monitoring system 10. If after a predetermined time interval no signal has occurred, billing computer 38 through modem I will poll photocopier monitoring system 10 to ascertain the status of the copier being monitored by photocopier monitoring system 10 and retrieve the information stored in RAM 28.

Flags equivalent to a predetermined count value and a predetermined time period are stored in RAMs 28 to indicate the appropriate time interval for reporting to the central billing center. Computer control 16 contains a ROM 32 which contains a program for allowing monitoring CPU 24 to determine when the time generated by real time clock 30 equals the predetermined time period stored in a designated RAM 28. When the two time periods match, monitoring system CPU 24 sends a signal through modem 14 to billing computer 38 indicating that the predetermined time period has ended and forwards the total count value to the billing computer. By providing a flag contained within the memory of computer control 16, the copier monitoring system provides automatic periodic billing. Accordingly, billing occurs at the appropriate time.

To indicate the appropriate intervals at which preventive maintenance should occur, ROM 32 contains a program for allowing monitoring CPU 24 to determine when the count value generated by monitoring CPU 24 equals the predetermined count value stored in a RAM 28. ROM 32 acts as a secondary clock allowing monitoring CPU 24 to identify when a predetermined count number has been reached. When ROM 32 has been triggered monitoring CPU 24 sends a signal through modem 14 indicating that the predetermined number has been reached. By providing a flag contained within the memory of computer control 16, the copier monitoring system provides an automatic preventive maintenance signal to a service center. Accordingly, preventive maintenance can occur at the appropriate time after the count detector has detected a predetermined number of pages.

The photocopier (not shown) produces internal signals for producing an output on a visual display device or like display including a diagnostic signal for signaling to the user of the copier when a system failure, such as a paper jam or a part malfunction has occurred. Each different copier model produces different formats of diagnostic signals. This signal is provided along a cable between a copier's internal CPU for generating the diagnostic signal and the copier's display device for users. Interface circuit 20 intercepts these diagnostic signals from the copier and acts on them to place them in a form readable and useable by the billing computer at the central station.

In photocopier monitoring system 10 interface circuit 20 remains passive to the copier and is programmed to detect the particular diagnostic signals of each model copier and translates these signals into predetermined codes for transmission to the central station billing or other computer. Interface circuit 20 receives each diagnostic signal and translates the copier specific diagnostic signal into an output signal which may be understood by local computer control 16. When necessary the diagnostic signal is formatted by interface circuit 20 by adjusting the signal voltage to place it in a condition useable by computer control 16 and modem 14. Computer control 16 then translates, when necessary, the output of interface circuit 20 to a format understandable by a billing or other computer at a central station. As will be described below in connection with a preferred embodiment, the interface is interchangeable and taps into the diagnostic signal transmitting cable of the copier without interfering with the operation of the copier or requiring multiple connections to various portions of the copier.

To reduce the number of wires necessary to transmit the translated signal to computer control 16, the incoming diagnostic signal, after being translated by interface circuit 20, may also be serialized by a serializer 22 when necessary.

In an exemplary embodiment serializer 22 is a dual asynchronous receiver/transmitter device which provides two channel asynchronous serial communication for interfacing with computer control 16 and modem 14. Serializer 22 transmits the parallel signal to computer control 16. Serializer 22 is preferably used when the output of the copier to interface 20 is in a parallel formation. Generally, a serializer is not necessary when the copier signals transmitted by interface circuit 20 are in parallel and computer control 16 is adapted to accept data in a parallel format or the diagnostic signal internally generated by the copier is a serial signal.

In another embodiment the serializer receives serial data from copier, analyzes it for condition code validity, and sends only valid error conditions to CPU 16, (It "filters" errors between copier and CPU.) CPU gets valid errors from interface in a parallel data stream or serial depending on the copier model.

The formatted output signal is transmitted to serializer 22 which serializes the output signal. The serialized signal is transmitted to monitoring CPU 24 which translates the signal and which signals modem 14 to begin sending the serialized formatted translated signal to a service center. The diagnostic data of the photocopier may be stored, if required, in RAM 29, which can also store maintenance information, such as data related to recent service and data as to when certain copier parts were replaced. Such information can be input and retrieved by the service person using a portable input/output device 34 more particularly described below. This information is particularly useful where communication with the central station is disrupted.

Additionally, the maintenance status of the copier may be ascertained by the billing or other computer located at the central station. The billing or other computer sends a status inquiry signal to monitoring CPU 24 causing controller 16 to output the information stored in RAM 29.

At the central station, the signal is received indicating to the central station the nature of the copier trouble. By providing an interface 12 which intercepts and interprets internal diagnostic signals of a copier and signals a computer control circuit to signal a central station, automatic reporting and diagnosing of the copier is accomplished, thus minimizing human error, human intervention and the guess work of copier repair. Upon receipt of the diagnostic signal the central station then dispatches a service person and informs the service person of the nature of the problem and the requisite tools and parts.

Each service person may be equipped with a portable hand held input/output device 34 in the form of a keypad/display which may become part of the system through an auxiliary input 22a of monitoring CPU 24. In another embodiment it may be input through an auxiliary input external to interface 12. Input/output device 34 may also include internal memory (not shown). This allows the service person to read out the diagnostic information from the system. The service person at the job site may also communicate with the central station through modem 14 by becoming part of system 10, through input/output device 34. The service person at each job would input his time of arrival at the job site, the work completed, parts replaced and needed, and then the time of the completion of the job. By providing such an input/output system, the copy monitoring system may maintain service inventory as well as service billing on a real time basis, while providing a method for keeping track of employees. Furthermore, the dispatcher at the central station can transmit data for the service person by storing retrievable information in RAM 29. The service person may then connect his input/output device 34 and retrieve the information stored in RAM 29 so that the central station may communicate with each service person directly through photocopier monitoring system 10 saving the time necessary for the service person to call into the central station for further instructions. The message would be printed out on a display (not shown) of input/output device 34. The display of input/output device 34 may comprise an LED or LCD display.

A voltage regulator 36 is provided to maintain a constant voltage source during power outages. Voltage regulator 36 receives AC power from the power supplied at the copier site and 5 volts from the copier itself, and transmits a Va voltage to the various circuits and a voltage VRAM to the memory. When voltage regulator 36 detects a failure in power from both the AC power source and the copier, voltage regulator 36 switches to an alternate battery power source. In a preferred embodiment the battery may be a lithium or rechargeable battery.

When monitoring CPU 24 determines that 45 minutes has elapsed from the detection of power failure in both the AC power source and the 5 volt copier power source based upon inputs from clock 30 and instructions stored in ROM 32, monitoring CPU 24 causes computer control 16 to power down to conserve the battery. The powering down decreases power consumption by a factor of 10. When such a powering down feature is provided by computer control 16 a non-volatile RAM 29 is utilized to store the vital information even during the power down mode. If the copier or photocopier monitoring system 10 is powered up prior to the battery dying computer control 16 remains in the sleep mode. Receipt of a first meter count signal reactivates computer control 16 causing the photocopier monitoring system to notify the central office at billing computer 38 that it has been asleep. Clock 30 is then compared with the clock of billing computer 38 to insure that clock 30 is in sync. By utilizing the first meter count to activate computer control 16, the occurrence of the sleep report call is randomized so that in the event of a citywide black-out, not all photocopiers call billing computer 38 at the same time thereby preventing traffic jams on the telephone network.

Figure 2:
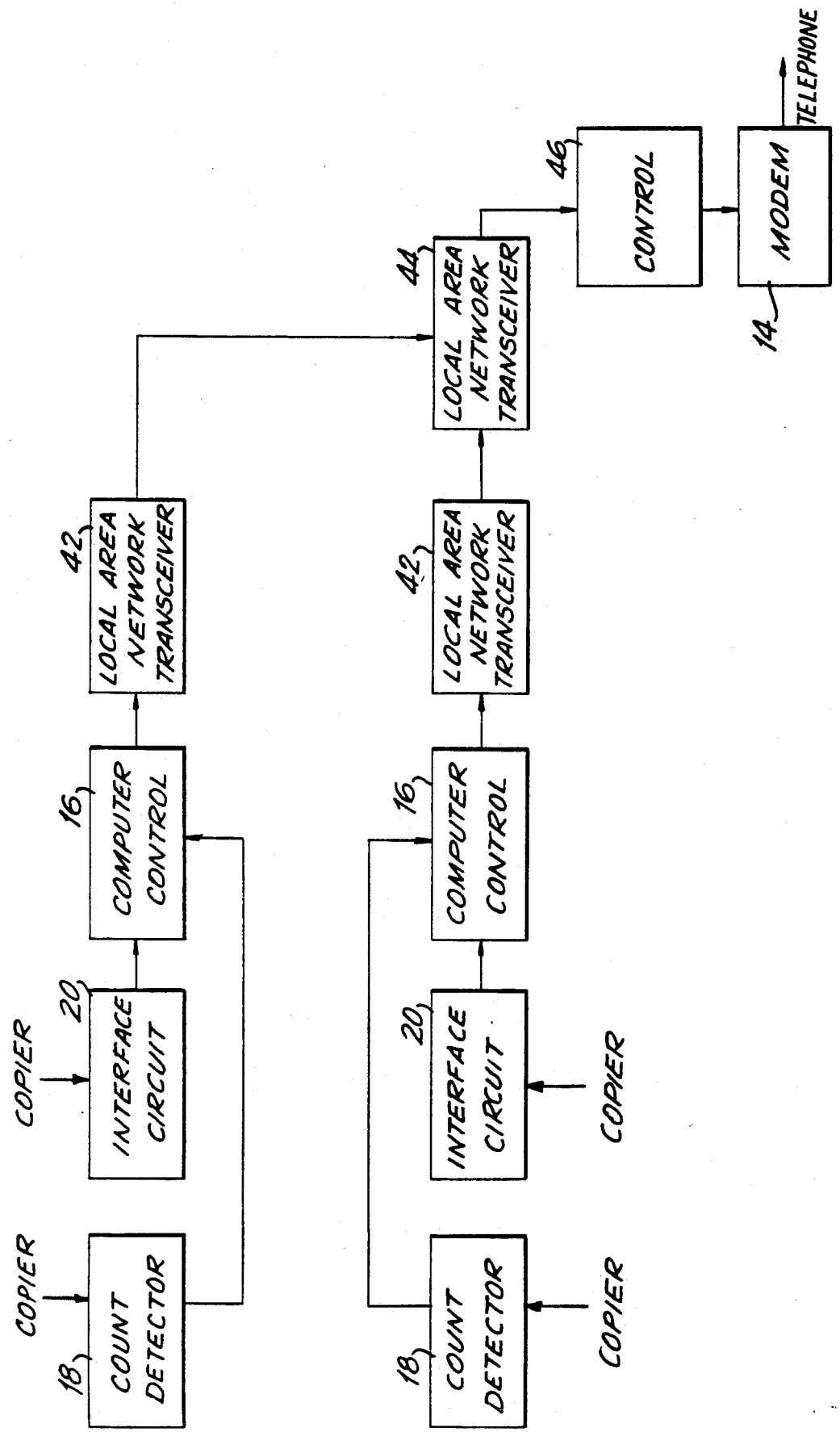
FIG. 2 is a block diagram of an alternative embodiment of the invention.

Reference is now made to FIG. 2 wherein an alternative embodiment for the photocopier monitoring system, generally indicated as 40, for monitoring a plurality of copiers is provided. Monitoring system 40 also includes count detector 18 for each copier. Each count detector 18 inputs a count signal to respective computer controls 16. An interface circuit 20 also monitors the copier diagnostic signals from each respective copier. Interface circuit 20 transmits the diagnostic signal to respective computer controls 16. Counters 18, interface circuits 20, and Computer controls 16 behave in a manner identical to that in system 10.

In this embodiment each computer control 16 transmits its signals through an on-site local area network transceiver 42. Generally, control 46 polls each copier station at predetermined intervals and stores information received from each local computer control 16 and transmits that information at a predetermined time through modem 14 to the billing center. Each local area network transceiver 42 transmits a signal to a local area network transceiver 44 at a site removed from the copier. Local area network transceiver 44 then transmits the signal to central computer control 46 which operates on the information in an identical manner as local computer control 16 of system 10. Each local computer control 16 also stores malfunction occurrence information which is not transmitted until polled by control 46. However, if there is a paper jam malfunction detection which exists for more than a preprogrammed time, such as forty-five minutes, local computer control 16 will detect this condition using its internal clock and will notify control 4 to notify the central station. The polling period is fairly short, to allow prompt service reporting. In an exemplary embodiment the period is several minutes.

Computer control 46 transmits its signals through modem 14 to a billing or other computer at a central station along the telephone lines. Local area network transceivers 42, 44 may be a carrier current modem utilizing the power lines contained within an office space, a high frequency transmitter and receiver or a telephone and modem located at both the copier station and the computer control circuit 16 station. By providing a local area network between the computer control circuit and the copier, it becomes possible to monitor a plurality of copiers while tying up only a single external telephone line saving telephone time and telephone space. Although only two copiers are depicted in FIG. 2 by way of example, the system is applicable to any number of copiers.

Figure 3:
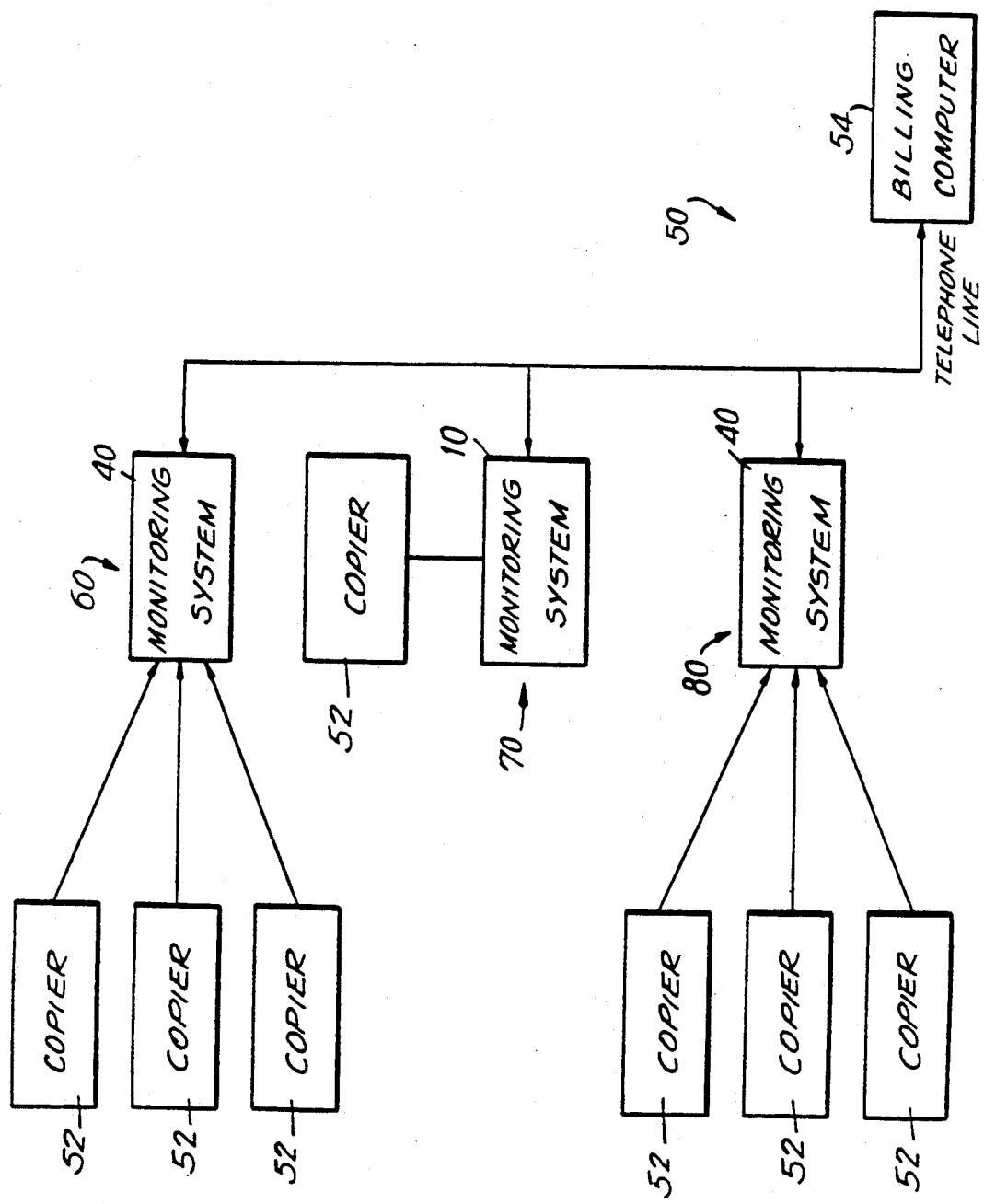
FIG. 3 is a block diagram of a billing network in accordance with the invention.

Reference is now made to FIG. 3 wherein a photocopying monitoring and billing system generally indicated as 50 constructed in accordance with the invention is depicted. A plurality of photocopier monitoring systems 60, 70, 80 are situated at separate sites such as individual offices or buildings. Monitoring system 60 includes a plurality of copiers 52 and a photocopier monitoring system 40 for connection with a billing or other computer 54 located at a central station. Similarly, system 70 comprising a single copier 52 and a monitoring system 10 is also connected to billing computer 54 through the telephone line as is system 80 having a monitoring system 40 for connecting a plurality of copiers 52.

In accordance with the invention each photocopier monitoring system 40 or photocopier monitoring system 10 signals billing computer 54 at predetermined intervals to transmit the number of copies processed by each copier 52 of respective copying systems 60, 70, 80. Upon receipt of this information billing computer 54 generates the bills for each customer corresponding to the information received from the respective photocopying systems as discussed above. Additionally, billing computer 54 stores the predetermined time interval for each monitoring system and if a signal is not received from the monitoring system at a predetermined time interval billing computer 54 will signal the non-reporting system and trigger the photocopier monitoring system to transmit the stored data associated with each copier. Accordingly, by providing a plurality of monitoring systems which automatically indicate to a billing computer the number of copies processed at predetermined intervals an automatic, accurate and timely billing system is provided.

Reference is made to FIG. 4 in which an alternative embodiment of a photocopier monitoring system, generally indicated as 90, is provided. Photocopier monitoring system 90 operates in a substantially similar manner to photocopier monitoring system 10, but embodies an exemplary embodiment containing interchangeable programmable personality modules to allow greater flexibility in the application of the monitoring system.

A meter/counter monitor 100 is affixed to the copier and monitors the number of sheets processed in a manner identical to counter 18 above. Meter/counter monitor 100 is an optocoupler, magnetic detector or the like which provides an interrupt signal to a monitoring CPU 102 each time a piece of paper is processed.

Monitoring CPU and RAM 102 receives the interrupt signals from meter/counter monitor 100 and counts the interrupts received and increments by one a count value corresponding to the number of sheets processed. Monitoring CPU and RAM 102 includes an internal RAM for storing the count value. Monitoring CPU and RAM 102 assigns the count value an address within the RAM. Monitoring CPU and RAM 102 retains the address information for each respective count.

Monitoring CPU and RAM 102 contains flag information stored at other addresses within the internal RAM. The RAM may contain an identification number identifying the copier associated with each individual photocopier monitoring system. In an exemplary embodiment this is represented by a six digit code. The RAM also stores a service telephone number corresponding to the telephone number of a service computer and the telephone number of the billing computer or a single telephone number for both functions. A security code to block entrance to the photocopier monitoring system by non-authorized users is also stored within monitoring CPU and RAM 102. Monitoring CPU and RAM 102 also stores the last malfunction recorded as well as a time indicator such as time of day and date as to when that error had occurred. Information such as the last time the meter was read, last time a malfunction was recorded, the end of the service contract and the last time a preventive maintenance requirement was reported are also stored in monitoring CPU and RAM 102. Flags as to when monitoring CPU and RAM 102 should report to the billing or service computer are also stored in the RAM.

Monitoring CPU and RAM 102 also contains internal software for maintaining an internal real time clock which in connection with an EPROM as will be discussed below allows photocopier monitoring system 90 to send time cycle related reports to the billing or service computers. Additionally, monitoring CPU and RAM 102 includes preprogrammed software for controlling the modem allowing photocopier monitoring system 90 to make the necessary report to the billing or service computers.

A portable input/output device 134 carried by a serviceman may be coupled to monitoring CPU and RAM 102 to receive and input information to the system.

As discussed previously, each copier contains an internal copier CPU for generating the diagnostic and monitoring signals which are displayed on a visual display device. These signals are transmitted along a cable to drive the display device. In copiers such as the Minolta 470Z, this cable contains a female/male plug connection along the signal transmitting cable. An interface 104 is attached to the copier's signal transmitting cable at the female/male plug connection without interfering with the operation of the display device and monitors the diagnostic signals generated by the copier CPU. Interface 104 is physically placed to intercept the signals generated by the copier CPU. Interface 104 formats the signals when necessary by adjusting the voltage of the intercepted diagnostic signals as needed to make them compatible with monitoring CPU and RAM 102.

As seen in FIG. 6 interface 104 may include a mounting board 200. A cable 205 receives the diagnostic signals generated by a copier CPU for transmittal to the copier display device. A first connector 202 for receiving a cable connector 204 of cable 205 is mounted on board 200. A second connector 206 is mounted on board 200 and receives a connector 208 of display cable 209 and passes the signal received from cable 205 through board 200 to the copier display device. Accordingly, operation of the copier is not interfered with. A cable 210 which is electrically coupled to board 200 connects with a third connector 212 for connecting with photocopier monitoring system 90.

In one example, first connector 202 would be a female twelve pin connector to receive the male plug 204 of cable 205. Accordingly, connector 206 is a male connector for receiving female connector 208 of cable 209. Cable 210 is a ribbon cable which extends to a female plug 212. If the cable which transports information from the copier CPU to the copier display device does not have a male/female plug interconnect along the cable then interface 104 may be formed as an insulation displacement slice type connector for coupling the cable to interface 104.

A personality module 106 receives the input formatted diagnostic signal from interface 10 and transmits the internal diagnostic signals to monitoring CPU and RAM 102. Monitoring CPU and RAM 102 translates the signal into a form useable by a service computer 103 at the central station. Personality module 106 may also receive the internally generated paper processing count transmitted to the display by the copier as a comparison number for the count value delivered by meter/counter monitor 100. This paper count is also transmitted to monitoring CPU and RAM 102. Personality module 106 periodically monitors the copier through interface 104 at predetermined timing intervals so as to detect the presence of any internal diagnostic signals generated by the copier CPU. Upon the detection of a diagnostic signal, personality module 106 serializes the diagnostic signal and inputs the signal to monitoring CPU and RAM 102.

Each copier model and/or brand has a distinct internal diagnostic signal. Therefore, personality module 106 is interchangeable, allowing an appropriate interface to be applied to the corresponding copier. In an exemplary embodiment personality module 106 may include a personality CPU (not shown) for translating the signals input along copier signal cable 205 (FIG. 6). The personality CPU translates the incoming copier CPU generated diagnostic signal and transmits a translated signal along cable 210 to photocopying monitor system 90.

An interchangeable EPROM 108 provides software for controlling the function of monitoring CPU and RAM 102. Monitoring CPU and RAM 102 reads programs from EPROM 108. The software contained in EPROM 108 determines how the monitoring CPU and RAM 102 processes the data received and stored in RAM and the flags stored in RAM. EPROM 108 may also contain programs for controlling the processing of the output from meter/counter monitor 100. Monitoring CPU and RAM 102 searches its RAM in accordance with programs stored in EPROM 108 to determine when the monitor count stored in its RAM equals the flag number also stored at a different address in the RAM of monitoring CPU and RAM 102. Once monitoring CPU and RAM 102 determines that a predetermined number of monitor counts has been accumulated in the RAM, monitoring CPU and RAM 102 reports to the billing or service computer through a modem 110 in accordance with a program stored in EPROM 108. The basic EPROM 108 may be replaced with different EPROMs to provide different software control making photocopier monitoring system 90 more complex by allowing monitoring CPU and RAM 102 to perform a greater variety of functions.

Among the programmable functions that EPROM 108 would allow a CPU 102 to perform are device identification so that monitoring CPU and RAM 102 provides the identifying number stored in its RAM to the billing or service computer 103 at the central station through modem 110 to identify itself. EPROM 108 can cause monitoring CPU and RAM 102 to transfer the last abort data corresponding to the last malfunction report stored in its RAM to indicate when the last copier failure occurred by month, day, year, hour and minute, as represented by the real time clock operated by monitoring CPU and RAM 102 along with a failure code corresponding to the translated diagnostic information provided by interface 104. As discussed, EPROM 108 contains programs causing monitoring CPU and RAM 102 to compare a flag stored in its RAM to determine when a billing cycle or preventive maintenance cycle has been completed, causing monitoring CPU and RAM 102 to notify the appropriate billing or service computer 103. EPROM 108 also contains programs controlling the determination of whether or not the proper password has been provided to allow an outside user contacting monitoring CPU and RAM 102 through modem 110 to retrieve information from photocopier monitoring system 90. EPROM 108 also controls the dialing out to the business telephone number and service telephone number stored in RAM of monitoring CPU and RAM 102.

Because all of the data including the flag upon which the program of EPROM 108 operates are stored in RAM, photocopier monitoring system 90 may be reprogrammed from a remote location through modem 110. For example, the flag data, and telephone numbers may be changed as needed. A computer may send a signal through modem 110 to reset the flags, the RAM, or information such as a business telephone number or service telephone number, resulting in EPROM 108 causing different computers to be contacted at appropriate times and changing the billing cycle or the service cycle.

Figure 8A:
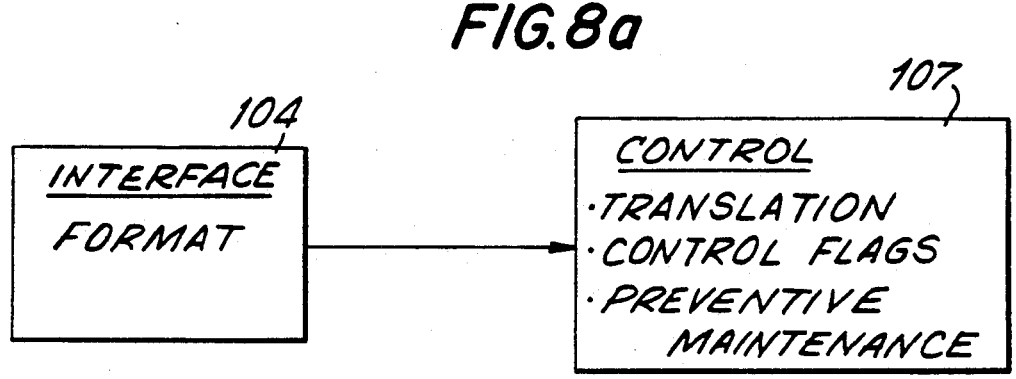
FIGS. 8a–8c are block diagrams of alternative embodiments of a system for monitoring a photocopier constructed in accordance with the invention.
Figure 8B:
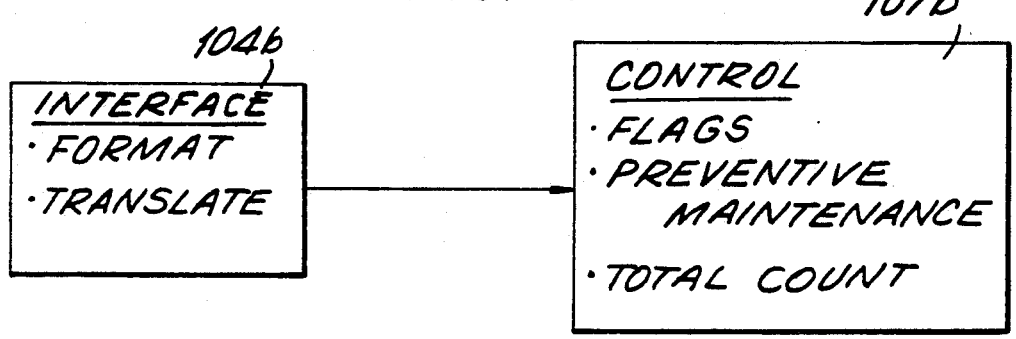
Figure 8C:
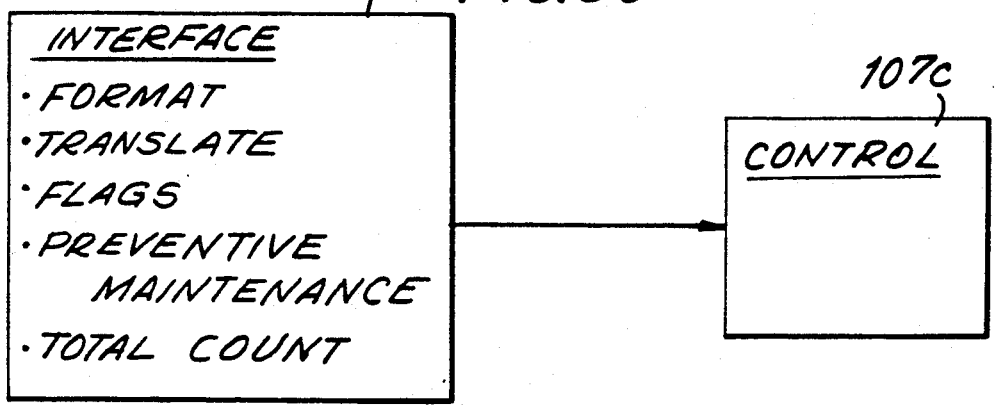

Reference is now made FIGS. 8a–8c, wherein a distribution of the functions of the monitoring system is provided. Generally the monitoring system has two components—an interface 104 and a control portion 107. In one of the examples of the invention described previously, a photocopier monitoring system includes an interface 104 which formatted the internal diagnostic signal and contained a personality module for translating the diagnostic signal. However, these functions as well as others performed by monitoring CPU and RAM 102 and personality module 106 in photocopier monitoring system 90 may be performed by structure found entirely in the interface or may be split between the monitoring system CPU and the interface, or may even in part be performed at the central station.

For example, as in FIG. 8a, an interface 104a merely formats the signal and transmits the formatted signal to a control portion 107a acting as an enhanced monitoring CPU personality module which performs the functions of both monitoring CPU and RAM 102 and personality module 106 Control portion 107a then translates the signal to a form useable by the billing and service computer. Additionally, this enhanced monitoring CPU provides the other functions of monitoring CPU and RAM 102 as discussed previously such as controlling operation of the monitoring system, storing flags and operating on the flags, and notification of the count value at appropriate times. Accordingly, in the photocopying monitoring system of FIG. 8a, there are two distinct portions of a monitoring system—a formatting portion 104 performed by the interface and a control portion 107a which performs the functions of personality module 106 and monitoring system CPU 102 as discussed above.

In a monitoring system as shown in FIG. 8b, which approximates monitoring system 90, the functions are more evenly split between the interface 104b and control 107b. In this embodiment, interface 104b formats the diagnostic signal and includes an EPROM and CPU for monitoring and translating the diagnostic signal. Control portion 107b includes a monitoring CPU and RAM including flags and is associated with an EPROM for controlling operation of the monitoring system, allowing transmittal of data such as copy count data to perform billing and preventive maintenance, and notification that a malfunction has occurred as discussed in greater detail above.

A third photocopier system as shown in FIG. 8c includes an interface 104c which not only formats the signal and translates the diagnostic signal, but includes the flags and performs the function of monitoring CPU and RAM 102 as described in connection with photocopier monitoring system 90. In this embodiment, interface 104c acts as the interface, personality module and as the monitoring system CPU. Interface 104c outputs translated diagnostic signals when detected as well as the notification signals associated with the end of a billing cycle, preventive maintenance cycle or historic occurrences such as the end of the contract. This signal is provided to a control portion 107c which is no more than a CPU for controlling a modem for contacting the billing computer or service computer at the central station. This is in contrast to the embodiment of FIG. 8a in which the personality is contained away from the interface and the embodiment of FIG. 8b in which the personality module functions are found in the interface and the controlling functions are found in the CPU 102b.

The embodiment of FIG. 8c is particularly applicable to situations in which the entire monitoring system is manufactured internal to the photocopier to which this is to be applied. However, due to FCC regulations the modem must be external or externally reachable and therefore the modem and its CPU is located at a separate position.

In still another embodiment, the translating function is performed at the central billing and service computer. All that is transmitted for malfunctions are certain detected diagnostic signals. The central billing and service computer determines from the identification data the specifics of the photocopier being monitored and performs the translation function from its stored look up tables.

Reference is now made to FIG. 5 wherein a flowchart illustrating the operation of photocopying monitoring system 90 is provided. Initially the appropriate flag values and phone numbers are stored as data in specified addresses of the RAM of monitoring CPU and RAM 102 in accordance with a step 300. A proper interface 104 is provided for translating the specific diagnostic signal of the photocopier to be monitored. EPROM 108 is selected to provide the desired functions for monitoring CPU and RAM 102. Counter monitor 100 sends an interrupt signal to monitoring CPU and RAM 102 each time a piece of paper is processed by the copier in accordance with a step 302. Monitoring CPU and RAM 102 increments a count value stored in its internal RAM each time an interrupt signal is received in accordance with a step 304. Monitoring CPU and RAM 102, utilizing the programs stored in EPROM 108, monitors this count value and compares the count value stored in its RAM to the flag value stored in its RAM in accordance with a step 306 to determine whether a billing cycle or preventive maintenance cycle has elapsed. When monitoring CPU and RAM 102 identifies a match between the incremented value in its RAM and the flag value stored in the RAM of monitoring system CPU and RAM 102 it contacts the appropriate billing or service computer in the central station through a modem 110 to inform the central station that preventive maintenance is required or that a billing cycle has elapsed.

As previously discussed monitoring system CPU 102 generates an internal real time clock in a step 309. Monitoring system CPU 102 in accordance with another program stored in EPROM 108 compares the predetermined billing and maintenance time cycle values stored as a flag in the RAM of monitoring system CPU 102 with the real time value generated within monitoring system CPU 102 in accordance with a step 310. When monitoring system CPU 102 identifies a match between a value being produced by the real time clock of monitoring CPU 102 and the flag value stored in the RAM of monitoring system CPU 102 monitoring system CPU 102 contacts the appropriate computer in step 308.

Simultaneously, in a step 311 interface 104 monitors the copier to detect the presence of any internal diagnostic signals being generated in a step 312. Upon detection of a diagnostic signal, interface 104 transmits the signals to monitoring CPU 102 which translates the signal into a form useable by the billing and service computers in a step 314. Monitoring system CPU 102 in accordance with step 308, contacts the billing and service computers at the central station through modem 110 and reports the identity of the copier, the time and date of the malfunction as well as a two or more digit code indicating the malfunction type. This information is then stored in the RAM as the last malfunction to occur in the copier in a step 316.

Photocopier monitoring system 90 may also be one of a number of photocopiers in a local area networks system as described above in connection with photocopier monitoring system 50. In such a system modem 110 would be replaced with a local area network such as a carrier current modem for communicating with the central monitoring CPU. The central monitoring CPU would be provided with EPROM which acts in a manner similar to EPROM 108, but at predetermined intervals. In accordance with polling programs contained in the central EPROM, central monitoring CPU polls each of the local monitoring CPUs 102 and stores that information in a RAM of central monitoring CPU which is larger than the RAM of each local monitoring CPU and RAM 102 and is constructed in parallel to retain the stored information of each local monitoring CPU and RAM 102.

Figure 9:
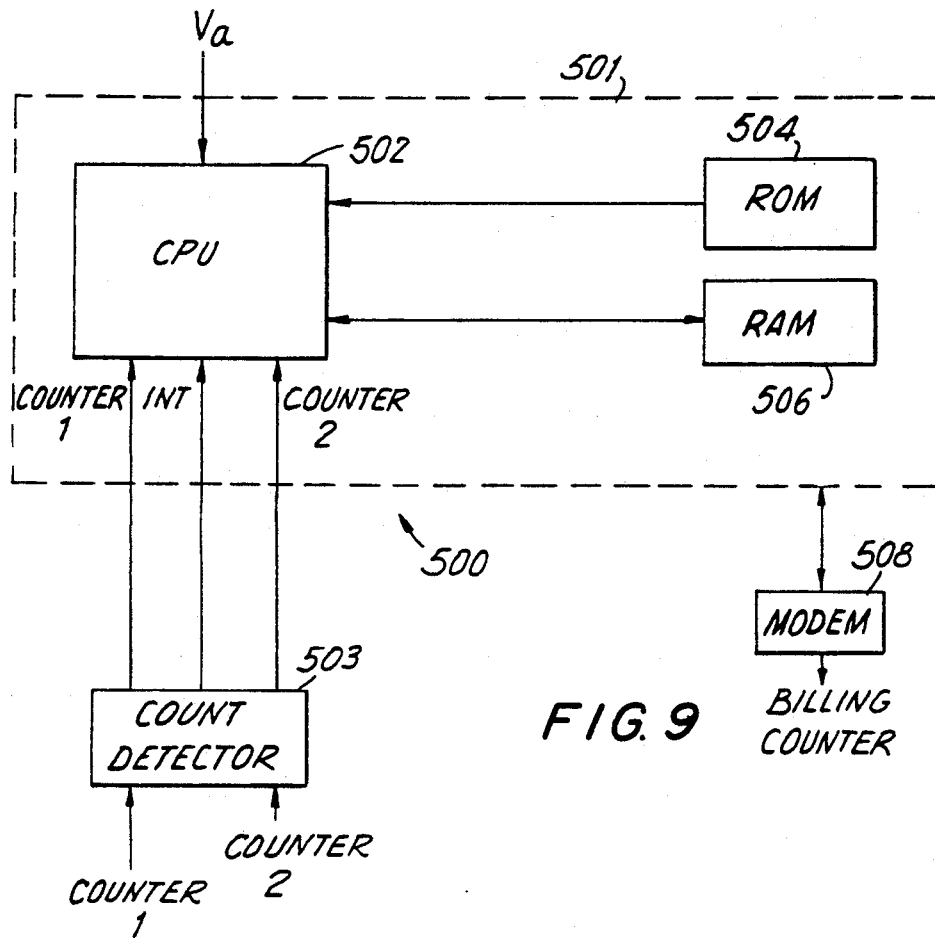
FIG. 9 is a block diagram of a system for monitoring a photocopier constructed in accordance with another embodiment of the invention.

Reference is now made to FIG. 9 wherein a photocopying monitoring system, generally indicated as 500, constructed in accordance with another embodiment of the invention is depicted. Photocopying monitoring system 500 is similar to that of photocopying monitoring system 90, photocopying monitoring system 500 merely monitoring the number of counts and not including an interface 104 or personality module 106 for monitoring the internal signals of the photocopier. System 500 includes a computer control 501, a modem 508 and a count detector 503. Computer control 501 causes modem 508 to transmit notification signals to a billing computer at appropriate intervals based upon inputs from count detector 503.

Computer control 501 includes a monitoring CPU 502 coupled to a ROM 504 and RAM 506. ROM 504 stores instructions for operating CPU 502 and RAM 506 stores data such as count values and identification codes. The data of RAM 506 is operated upon by CPU 502 in accordance with instructions from ROM 504.

Many paper processing devices utilize more than one size paper, different types of paper or maintain a paper processing count depending upon the types of color ink which are used. Therefore, they employ several paper trays or paper processing stations located at different positions requiring monitoring several paper sources simultaneously. However, each of these separate multiple paper sources provides a count signal to indicate the use of each type of paper. For ease of explanation, photocopier monitoring system 501 monitors a device utilizing two distinct paper sources. The paper processing device provides an internal count signal COUNTER 1 to indicate each time a piece of paper has been processed by a paper processing device at a first location and a second count signal COUNTER 2 to indicate that the paper has been processed by the paper processing device from a second source. Count detector 503 inputs an interrupt signal INT to monitoring CPU 502 causing monitoring CPU to determine whether to increase the count value for a piece of paper in RAM 506.

Figure 11:
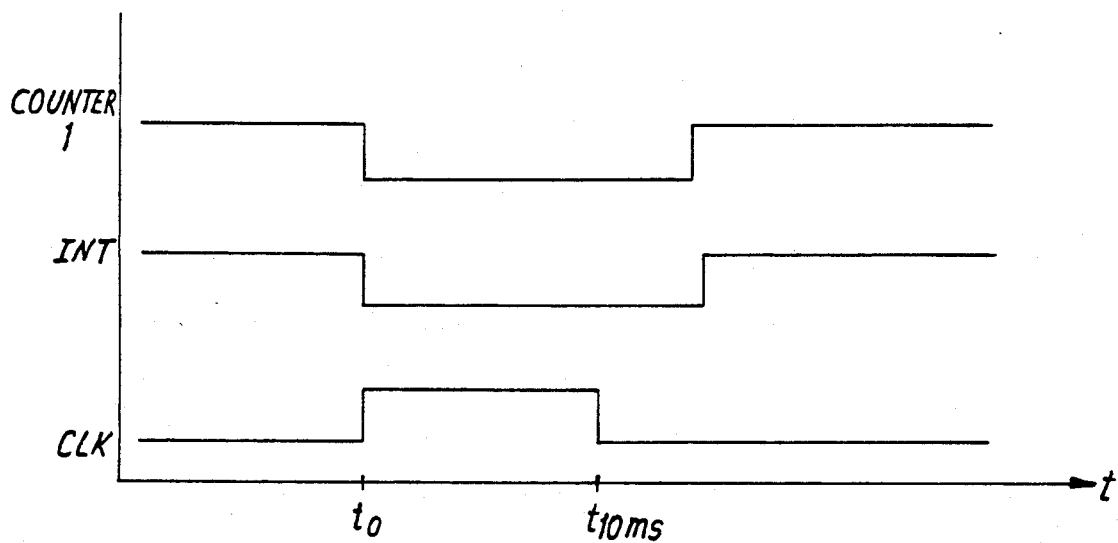
FIG. 11 is a timing chart for the meter counter monitor of FIG. 10.
Figure 10:
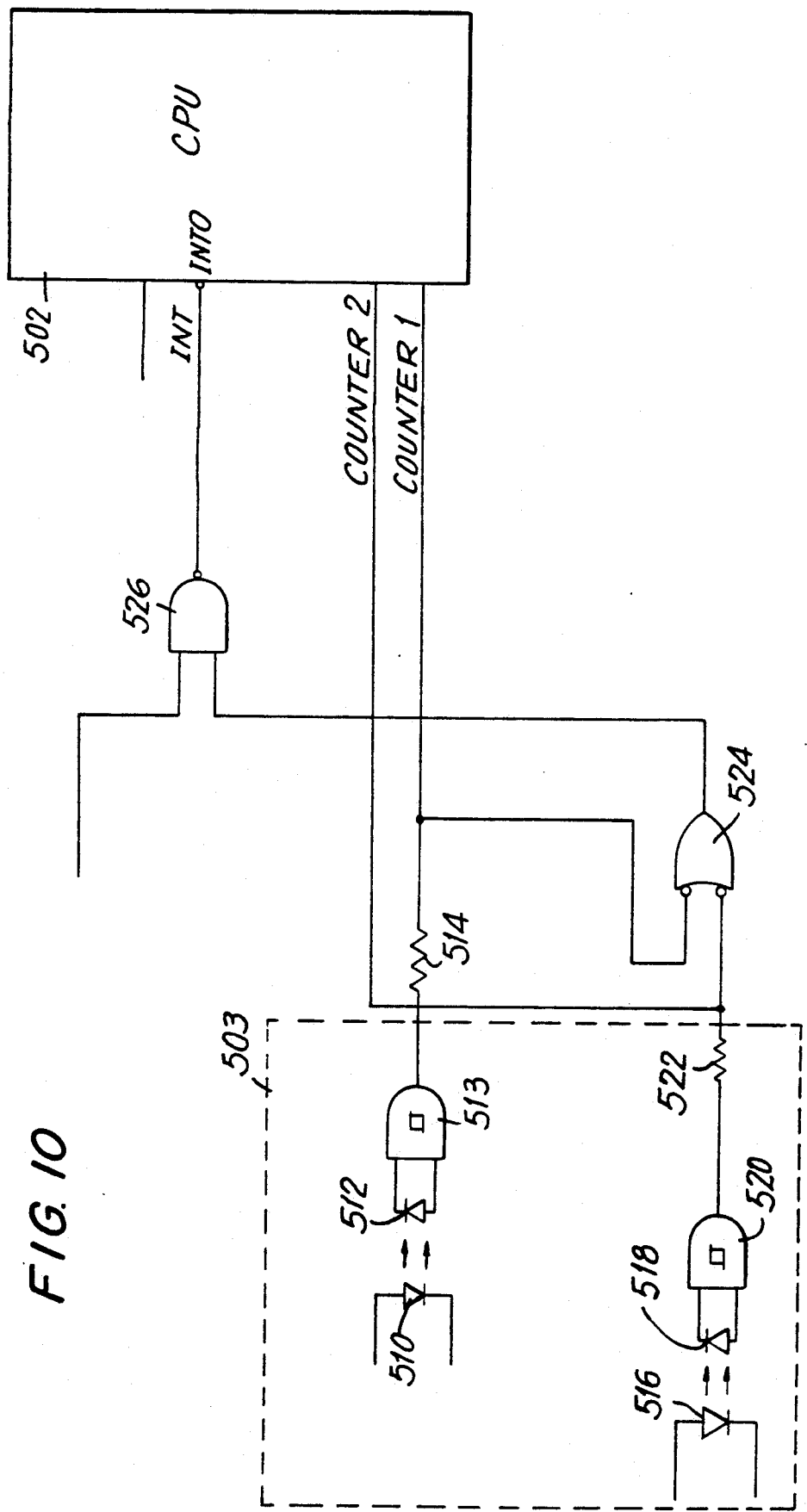
FIG. 10 is a circuit diagram of a meter counter monitor constructed in accordance with a second embodiment of the invention.

Reference is now made to FIGS. 10 and 11 in which one example, an optocoupler version, of a count detector 503 is provided. As discussed, in connection with count detector 18, many photocopying machines have an internal mechanical counter utilizing two input terminals for connection to the internal circuitry of the photocopying machines. Where more than one mechanical counter is provided the photocopier also provides two pairs of input terminals for connection to the internal circuitry of the photocopying machine, i.e., two input terminals for each mechanical counter. A first LED 510 is coupled across the terminals of the internal mechanical counter and is activated upon receipt of COUNTER 1. A photodetecting diode 512 is optically coupled to LED 510. Photodetecting diode 512 is coupled to a Schmitt Trigger 513 which smoothes the signal. Since photodetecting diode 512 is coupled to LED 510, photodetecting diode 512 provides the output COUNTER 1 to CPU 502 through a resistor 514.

Similarly, a second LED 516 is coupled across the input terminals of a second internal mechanical counter associated with a separate paper source for the same photocopying machine. LED 516 receives COUNTER 2 as an input and is optically coupled to a photodetecting diode 518 coupled across a Schmitt Trigger 520 which produces an output COUNTER 2 across a resistor 522 to CPU 502. An OR gate 524 receives an inverted COUNTER 2 as a first input and an inverted COUNTER 1 as a second input and outputs a trigger signal to a NAND gate 526. NAND gate 526 receives a constant high input at its other terminal and provides an interrupt signal INT to CPU 502.

In the embodiment described above, the production and monitoring of signal COUNTER 1 and signal COUNTER 2 is identical. Accordingly, the output of signal COUNTER 1 will be described as exemplifying both for simplicity of description. When a piece of paper is processed by the paper processing device, a count signal COUNTER 1 is input to LED 510 lighting LED 510. Photodetecting diode 512 detects the light of LED 510 and turns ON, producing a signal through Schmitt Trigger 513 which smoothes out COUNTER 1 and produces a low signal when a meter count has been detected as seen in FIG. 11. COUNTER 1 is input to CPU 502. COUNTER 1 is also input at OR gate 524. When signal COUNTER 1 goes low then its input is inverted to be high when input into OR gate 524. Since at this time signal COUNTER 2 is high (not in use), the output of OR gate 524 will be high. The output of OR gate 524 is input to NAND gate 526 where it is combined with a constant high input to produce a low value as the interrupt signal INT simultaneously with the low signal COUNTER 1.

Upon receipt of the interrupt signal INT, CPU 502 generates an internal clock CLK having a time period less than the anticipated duration of a true count signal but greater than the duration of noise signals or "glitches". Clock signal CLK goes high simultaneously with the detection of a low interrupt signal INT and lasts for a duration larger than an invalid count signal and less than the duration of the valid count signal. By way of example a value of 10 ms is used in a preferred embodiment. CPU 502 compares signal COUNTER 1 to the clock signal CLK. If signal COUNTER 1 is still low when clock signal CLK goes low, then a valid count has been detected.

A total count value is stored in a RAM 506. After monitoring CPU 24 has determined that a valid paper processing signal has occurred CPU 24 counts the number of count signals detected by storing a total count value in a non-volatile increments the total count value stored in RAM 506. RAM 506 may store the total counts attributable to count signal COUNTER 1 separately from counts indicated by count signal COUNTER 2 as well as combining the two totals. In accordance with programs stored in ROM 504, monitoring CPU 502 controls where the respective total count values have been stored by assigning an address to each total count value.

The real time clock generated within CPU 502 is also utilized to cause monitoring CPU 502 to retrieve the count information stored in RAM 506 at predetermined intervals. The data stored in RAM 506 is transmitted to CPU 502 which then causes the information to be transmitted to a billing computer through modem 508. Additionally, as discussed in greater detail above, ROM 504 may contain instructions allowing CPU 502 to transmit the information after a predetermined total count value has been stored in RAM 506.

By providing a CPU 502 having an internal clock which begins upon receipt of an interrupt signal coincidental with receipt of a meter count signal and compares the internal clock with the received meter count signal, CPU 502 is able to distinguish actual paper processing counts from voltage spikes and other glitches produced by the internal circuitry of computer control 501. This prevents false counts and false reporting of information by monitoring system 500.

Again, as discussed in connection with monitoring system 90, the internal clock of CPU 502 may be set for monthly intervals thereby causing monitoring CPU 502 to transmit the number of copies made each month. The times at which each monitoring system reports this central station is again staggered s that not all copier monitoring systems report at once preventing a report traffic jam at the central station billing computer. The central station billing computer also automatically receives the necessary information such as identification stored in RAM 506 facilitating billing and minimizing the need for human intervention.

Figure 12:
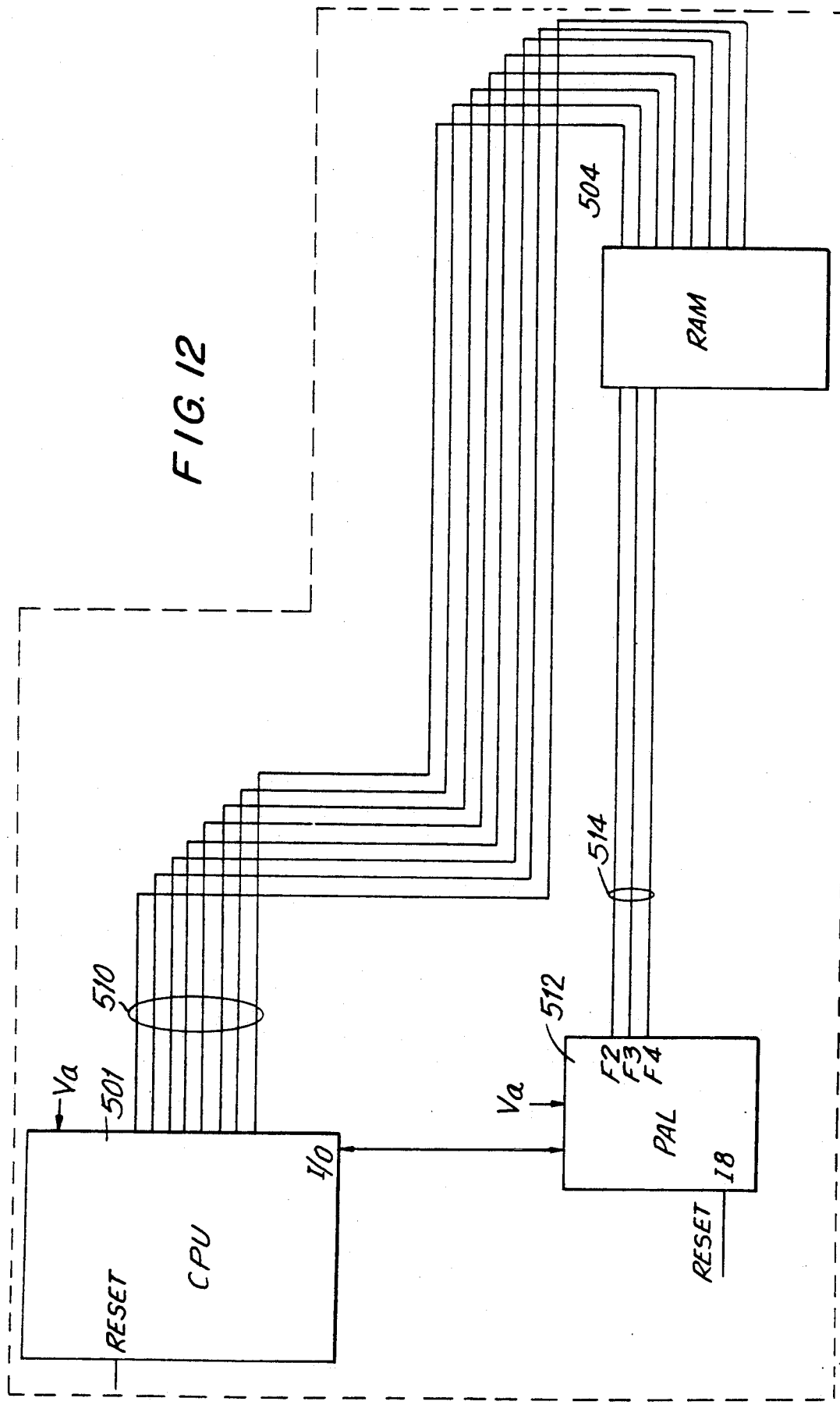
FIG. 12 is a block diagram of a system for monitoring a photocopier constructed in accordance with another embodiment of the invention.

Reference is now made to FIG. 12 in which a structure of control computer 501 for preventing damage to RAM 506 is provided. Like numerals are utilized to indicate like structure, the input from FIG. 10 as well as ROM 504 are removed for simplicity and ease of description.

A programmable logic array (PAL) 512 is coupled between CPU 502 and RAM 504. CPU 502 can read from and write on RAM 504 utilizing databus 510. PAL 512 also receives instructions from CPU 502 and decodes the instructions from monitoring CPU 502 and determines the addresses and ranges of RAM 504 to be accessed by providing instructions along databus 514. PAL 512 addresses RAM 504 through outputs F2, F3 and F4. If $V_a$ ever falls below 4.5 volts, it becomes difficult for controlling computer 501 to distinguish between noise at the low level or an instruction signal. Accordingly, photocopier monitoring system 200 operates at above 5 volts. If $V_a$ ever falls below 4.5 volts then a RESET signal is generated and input to PAL 512. This causes PAL 512 to shut down outputs F2, F3 and F4 locking out access to RAM 504. By shutting down these outputs, the memory in RAM 504 can no longer be addressed preventing reading and writing. Additionally, monitoring CPU can only access RAM 504 if the input/output signal along bus 510 is driven low. Monitoring CPU 502 receives the RESET signal causing CPU to become inoperative preventing the input/output signal from being driven low therefore isolating RAM 504 in a secondary way.

By providing a PAL 512 and CPU 502 which control the RAM 504 and which become disabled upon receipt of a RESET signal, RAM 504 becomes isolated from the surrounding circuitry protecting the integrity of the information stored in RAM 504 when power is reduced so that noise cannot effect writing in RAM 504.

The above monitoring systems were applied to photocopiers by way of example only. As the monitoring systems in accordance with the invention monitor the number of pages produced and internal diagnostic signals they are equally applicable to any printing or paper processing device such as a laser printer, facsimile device or the like.

It will thus be seen that the objects set forth above, among those made apparent from the preceding description, are efficiently attained and, since certain changes may be made in the above constructions without departing from the spirit and scope of the invention, it is intended that all matters contained in the above description and shown in the accompanying drawings shall be interpreted as illustrative and not in a limiting sense.

It is also to be understood that the following claims are intended to cover all the generic and specific features of the invention herein described and all statements of the scope of the invention in which, as a matter of language, might be said to fall therebetween.

What is claimed is:

1. A system for monitoring a paper processing device and reporting to a central station, the paper processing device including an internal diagnosing system for diagnosing malfunctions within the system, a display device for displaying the diagnosed malfunction, the diagnosing system providing an internal diagnostic signal specific to the paper processing device for causing the display device to display the malfunction comprising:

counter means for counting the number of papers processed by the paper processing device and producing a count signal corresponding to each paper processed;

first control means for receiving the count signal, totalling the count signal and transmitting the total count at at least one of a predetermined time interval and a predetermined count interval and producing a count trigger signal;

interface means for receiving the diagnostic signal without interfering with the operation of the display device, the first control means also receiving the diagnostic signal from the interface means and in response thereto producing a diagnostic trigger signal;

modem means for transmitting the total count signal to the central station upon receipt of said count trigger signal, the modem means also receiving the diagnostic trigger signal and transmitting the diagnostic signal in response thereto to the central station; and voltage regulator means receiving an AC power input, a power input from the paper processing device and a battery power input, said voltage regulator means providing power to said first control means utilizing said battery power when said voltage regulator means detects an absence of an input of AC power and power from said paper processing device.

2. The system for monitoring a paper processing device of claim 1, wherein said first control means includes clock means, said first control means receiving a clock input from said clock means and determining a time interval in response thereto during which battery power is supplied to said control means and placing said system for monitoring a paper processing device in a sleep mode when said time interval has exceeded a predetermined time interval.

3. The system for monitoring a paper processing device of claim 2, wherein said first control means causes said modem means to transmit a second signal to said central station upon receipt of a count signal from said counter means after said predetermined time interval.

4. A voltage regulator for a system for monitoring a paper processing device and reporting to a central station, said voltage regulator means receiving an AC power input, a power input from the paper processing device and a battery power input, and providing power to said system utilizing said battery power when said voltage regulator means detects an absence of both an input of AC power and power from said paper processing device.

5. The voltage regulator of claim 4, wherein said system includes counter means for counting the number of papers processed by the printing device producing a count signal corresponding to each paper process and first control means for receiving the count signal, totalling the count signal and transmitting the total count at at least one of a predetermined time interval and a predetermined count interval and producing a count trigger signal, said first control means including a clock means, said first control means receiving a clock input from said clock means and determining a time interval in response thereto during which battery power is supplied to said control means and placing said system for monitoring a paper processing device in a sleep mode when said time interval has exceeded a predetermined time interval.

6. The voltage regulator of claim 5, wherein the system for monitoring a paper processing device includes modem means for transmitting the total count signal to a central station upon receipt of said count trigger signal, said first control means causing said modem means to transmit a second signal to said central station upon receipt of a count signal from said counter means after said predetermined time interval.

7. A system for monitoring a paper processing device and reporting to a central station comprising:

at least one counter means for counting the number of papers processed by the printing device and producing a count signal corresponding to each paper processed;

first control means for receiving the count signal, totalling said count signal and transmitting the total count at at least one of a predetermined time interval and at a predetermined count interval and producing a count trigger signal; and interrupt means for generating an interrupt signal in response to said count signal, said first control means generating an internal clock for a predetermined time interval in response to said interrupt signal, said time interval being less than the duration of said count signal and greater than the duration of random noise signals and comparing said internal generated clock to said count signal and determining a count has occurred when said count signal exceeds said internal clock signal.

8. The system for monitoring a paper processing device of claim 7, wherein said interrupt means includes a NAND gate, an OR gate and means to detect multiple meter signals and generate an interrupt and validation sequence.

9. The system for monitoring a paper processing device of claim 7, wherein said counter means includes an LED and photodetecting diode.

10. The system for monitoring a paper processing device of claim 7, wherein said first control means includes a CPU, and a RAM, said CPU writing data in and reading data from said RAM and a PAL coupled to said CPU and said RAM for addressing the portions of said RAM written in or read from said CPU; power source means for providing a predetermined voltage to said PAL and said CPU, said PAL preventing access to said RAM by said CPU when said voltage falls below a predetermined level.

11. The system for monitoring a paper processing device and reporting to a central station comprising:

counter means for counting the number of papers processed by the printing device and producing a count signal corresponding to each paper process;

first control means for receiving the count signal, totalling the count signal and transmitting the total count at at least one of a predetermined time interval and a predetermined count interval and producing a count trigger signal;

said first control means including a CPU for totalling the count signal, a RAM coupled to said CPU for storing the total count and a PAL coupled between said CPU and said RAM for controlling the addresses at which said RAM is operated upon by said CPU;

power source means for providing power at a predetermined voltage level to said PAL and CPU, said PAL preventing access to said RAM by said CPU when said voltage falls below said predetermined level; and modem means for transmitting the total count signal to the central station upon receipt of said count trigger signal.

* * * * *